United States Patent [19]

Blanc et al.

[11] Patent Number: 4,654,565
[45] Date of Patent: Mar. 31, 1987

[54] APPARATUS AND METHOD OF ANODE POWER SUPPLY CONTROL DURING VERTICAL RETRACE

[75] Inventors: James J. Blanc; Bryan P. Hansen; Dale A. Kemper, all of Albuquerque, N. Mex.

[73] Assignee: Sperry Corporation, New York, N.Y.

[21] Appl. No.: 717,982

[22] Filed: Mar. 29, 1985

[51] Int. Cl.$^4$ .............................................. H01J 29/70
[52] U.S. Cl. ................................................... 315/411
[58] Field of Search .................... 358/74, 243, 72, 73; 315/411, 380, 408, 379, 381, 383, 384, 385

[56] References Cited

U.S. PATENT DOCUMENTS 4,010,401 3/1977 Yasumatsuya et al. ............. 315/411

Primary Examiner—Theodore M. Blum
Assistant Examiner—Gregory C. Issing
Attorney, Agent, or Firm—Howard P. Terry

[57] ABSTRACT

Apparatus and method for control of an anode voltage power supply for reduction of fluctuation in anode power supply output during the vertical retrace period, resulting in improvements in overall CRT display performance parameters.

3 Claims, 3 Drawing Figures

APPARATUS AND METHOD OF ANODE POWER SUPPLY CONTROL DURING VERTICAL RETRACE

The invention described herein was made in the course of or under contract with the United States Government.

BACKGROUND OF THE INVENTION

1. Field of the Invention

The present invention relates generally to power supply control and more particularly to an apparatus and method for control of a cathode ray tube (CRT) anode power supply voltage during vertical retrace.

2. Description of the Prior Art

In a raster scanned CRT the anode power supply load consists of the CRT beam current. Beam current, proportional to the video signal applied to the CRT cathode, is drawn from the CRT anode power supply as the trace scans the phosphor coated face of the CRT. During vertical retrace, the video signal is blanked resulting in a zero value for beam current and presenting a no-load condition for the anode power supply.

The on-off operation of the CRT beam current results in an upward step fluctuation of the CRT anode voltage during vertical retrace due to the inherent output impedance of a CRT anode power supply. This results in a higher anode voltage at the beginning of a scan than near the end. The anode voltage step fluctuation due to vertical retrace blanking causes a loss in resolution and distortion of the information displayed on the CRT.

Prior art solutions for minimizing step fluctuations in anode voltage sought to minimize closed loop output impedance. Prior art solutions include feedback control in the design of regulated power supplies and increasing the capacity of the power supply output filter capacitors. The prior art solutions have specific limitations. All currently known high voltage power supplies have significant time delays in their input/output transfer functions which limit the speed at which the feedback regulated power supply can respond to near instantaneous changes in output loading. Increasing the capacity of the filter capacitor increases its volume and cost as well as requiring further arc suppression in the event of an arcing condition.

The present invention improves on the prior art by incorporating, into the high voltage CRT anode power supply, a control signal, derived from the vertical synchronization signal, which is used to control the anode voltage during the vertical retrace period. During the vertical retrace period, the anode power supply is turned off resulting in the output capacitor not being charged. At the same time, the beam current load is effectively removed by blanking the video signal. Thus, the voltage across the anode power supply output capacitor remains substantially constant until both anode voltage and beam current are effectively turned on again at the beginning of the next scan cycle.

SUMMARY OF THE INVENTION

The present invention provides an apparatus and method for controlling anode power supply output voltage fluctuation during the vertical retrace period by providing a control stage which generates a pulse in response to a signal derived from the CRT video input signal. The pulse is used to turn off the anode voltage power supply during the no-load vertical retrace period.

Measurable improvements in CRT display performance are achieved in the form of reduced spot size growth, better uniformity of resolution over the entire screen and reduced dimensional stability errors.

DESCRIPTION OF THE PREFERRED EMBODIMENT

Figure 1:
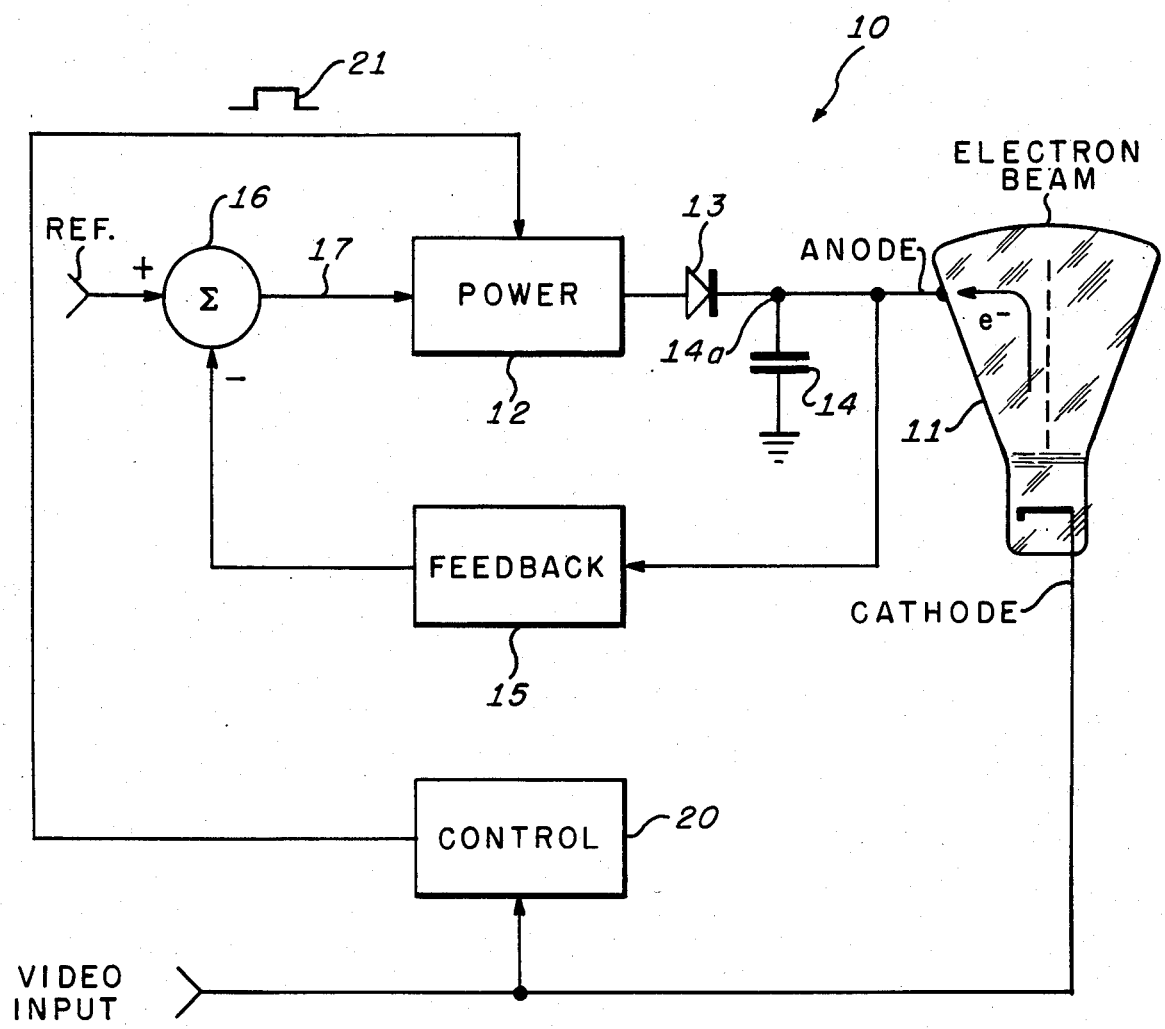
FIG. 1 is a block diagram of a regulated anode voltage power supply showing the control stage of the present invention.

Referring to FIG. 1, a CRT anode power supply 10 provides anode voltage to CRT 11. Power stage 12 typically steps-up an a.c. input voltage, not shown, which is then rectified, for example, by diode 13 and filtered, for example, by capacitor 14, to supply d.c. anode voltage to CRT 11.

A conventional negative feedback circuit 15 is connected between the power supply output 14a and summer 16. The output of feedback circuit 15 is compared to a d.c. reference voltage in summer 16 to provide a signal on line 17 for regulating the anode voltage. Due to the closed loop output impedance of CRT anode power supply 10, the anode voltage will step up as the step load condition is entered at vertical retrace. To prevent a step voltage rise in the power supply output voltage during vertical retrace control stage 20, whose operation will be described subsequently, provides a pulse 21 equal in width and occurring at the same time as the vertical retrace period. Pulse 21 may be applied, for example, to a power supply integrated circuit controller contained in Power Stage 12 such as UNITRODE Model 1525 (not shown) which removes the a.c. input voltage to the power stage during vertical retrace. With the a.c. input voltage removed, capacitor 14 cannot charge further and there will be no step voltage during the no-load vertical retrace period. Further, with no beam current load during vertical retrace, capacitor 14 will remain substantially charged. Thus, the anode voltage will remain nearly constant from the no-load condition during vertical retrace to the full load condition when CRT beam current is at a maximum during the active video portion of the scanning cycle.

Figure 2A:
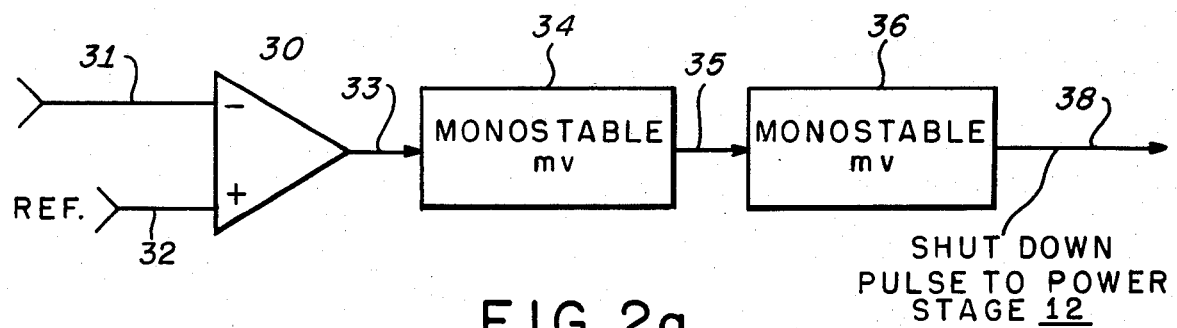
FIG. 2a is a diagram of the control stage of the present invention.
Figure 2B:
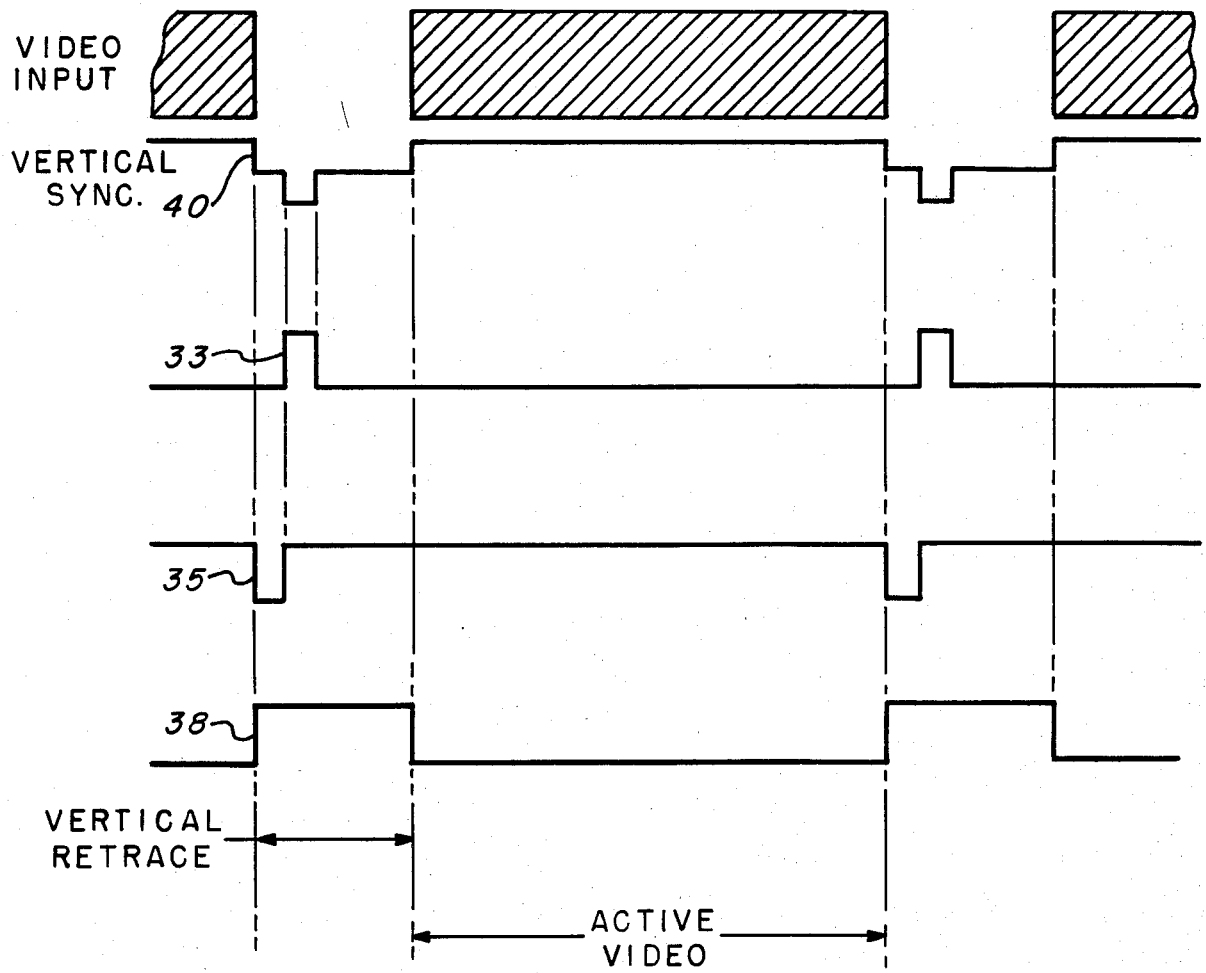
FIG. 2b is a timing diagram of the pulses in the control stage.

Referring now to FIGS. 2a and 2b, pulse 21 which is used to remove the a.c. input voltage from the power stage is generated as follows: The video synchronization signal 31 and a d.c. reference voltage 32 are input to comparator 30. When the vertical synchronization pulse becomes more negative than the d.c. reference voltage 32 comparator output pulse 33 is generated by comparator 30 and input to monostable multivibrator 34 which triggers on the rising edge of comparator output pulse 33. Monostable multivibrator 34 output pulse 35 continues until the beginning of the next vertical synchronization pulse 40. The falling edge of output pulse 35 triggers monostable mutivibrator 36 which outputs pulse 38 whose width is equal to the duration of the vertical retrace period. Monostable multivibrator 36 output pulse 38 is input to power stage 12 in FIG. 1. The rising edge of pulse 38 initiates removal of the a.c. input voltage from power stage 12. As a result of maintaining the same voltage from the end of one active scanning cycle to the beginning of the next active scanning cycle, there is more uniform resolution, a reduction in dimensional stability errors, and a reduction in spot size growth on the face of CRT 11.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. Apparatus for controlling the operation of a cathode ray tube (CRT) anode voltage power supply during vertical retrace comprising:

means for providing a video synchronization signal defining a vertical retrace period, means for providing a reference signal having a predetermined magnitude independent of said power supply, comparator means, means for applying said reference signal and said video synchronization signal to said comparator means to derive a trigger signal when said synchronization signal achieves a predetermined value with respect to said reference signal, pulse forming means coupled to receive said trigger signal for providing an output pulse substantially equal in duration and occurring in coincidence with said vertical retrace period, and means coupling said output pulse to deactivate said power supply for the duration of said vertical retrace period.

2. Apparatus in accordance with claim 1 wherein said comparator means includes a differential amplifier and said pulse forming means comprises:

a first monostable multivibrator for receiving said trigger signal and for providing a first monostable multivibrator output signal having a duration equal to the vertical scan interval, and a second monostable multivibrator for receiving said first monostable multivibrator output signal and for deriving therefrom said output pulse equal in duration to said vertical retrace period and for providing said output pulse to said CRT anode voltage power supply.

3. A method for controlling voltage fluctuations of a cathode ray tube (CRT) anode voltage power supply comprising the steps of:

providing a video synchronization signal defining a vertical retrace period, providing a reference signal having a predetermined magnitude independent of said power supply, comparing a first signal derived from said video synchronization signal and said reference signal to provide a trigger signal, forming an output pulse in response to said trigger signal, said output pulse having a duration equal to said vertical retrace period and occurring in coincidence with said vertical retrace period, and applying said output pulse to deactivate said anode voltage power supply for the duration of said vertical retrace period to reduce output voltage fluctuations of said power supply during periods of vertical retrace.

* * * * *